United States Patent [19]
Hamatani

[11] Patent Number: 5,898,289
[45] Date of Patent: *Apr. 27, 1999

[54] MOTOR START-UP CIRCUIT WITH A TRIAC AND PTC THERMISTORS

[75] Inventor: Junichi Hamatani, Shiga, Japan

[73] Assignee: Murata Manufacturing Co., Ltd., Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/831,992

[22] Filed: Apr. 1, 1997

[30] Foreign Application Priority Data

Apr. 16, 1996 [JP] Japan ................................ 8-094117

[51] Int. Cl.⁶ .................................................. H02P 1/42
[52] U.S. Cl. ............................................... 318/788
[58] Field of Search ....................................... 318/778–797

[56] References Cited

U.S. PATENT DOCUMENTS

| | | | |
|---|---|---|---|
| 3,544,869 | 12/1970 | Plouffe et al. ............................ | 318/788 |
| 3,562,587 | 2/1971 | Forst ........................................ | 318/783 |
| 3,683,250 | 8/1972 | Fricker . | |
| 3,965,392 | 6/1976 | Moorhead et al. ...................... | 361/29 |
| 4,161,681 | 7/1979 | Rathje ..................................... | 318/783 |
| 4,267,635 | 5/1981 | Blaha . | |
| 4,430,681 | 2/1984 | Benzing ................................... | 361/27 |
| 5,345,126 | 9/1994 | Bunch ...................................... | 310/68 C |
| 5,391,971 | 2/1995 | Yamada et al. ......................... | 318/778 |
| 5,451,853 | 9/1995 | Itoh ......................................... | 318/783 |

FOREIGN PATENT DOCUMENTS

| | | |
|---|---|---|
| 6-339291 | 7/1993 | Japan . |
| 7-123759 | 10/1993 | Japan . |
| 6349603 | 12/1994 | Japan . |

*Primary Examiner*—Jonathan Wysocki
*Attorney, Agent, or Firm*—Majestic, Parsons, Siebert & Hsue P.C.

[57] ABSTRACT

A motor start-up circuit is incorporated in a motor-driving circuit provided with an auxiliary coil which operates during a start-up time of the motor and a main coil for a steady-state operation of the motor. The start-up circuit in one form has a start-up thermistor with positive temperature characteristic and a Triac switch connected in series with the auxiliary coil and a triac-controlling thermistor with positive temperature characteristic connected in parallel to the start-up thermistor, and one of the terminals of the triac-controlling thermistor is connected to the gate of the Triac switch. The start-up circuit in another form has a Triac switch connected in series with the auxiliary coil and a triac-controlling thermistor with positive temperature characteristic connected in parallel to the auxiliary coil and the Triac switch and one of the terminals of the triac-controlling thermistor is connected to the gate of the Triac switch. In both forms, the triac-controlling thermistor has resistance 300–3000 Ω at 25° C. and volume of 30–60 mm³ and doubles its value of resistance at 25° C. at 70–125° C.

8 Claims, 6 Drawing Sheets

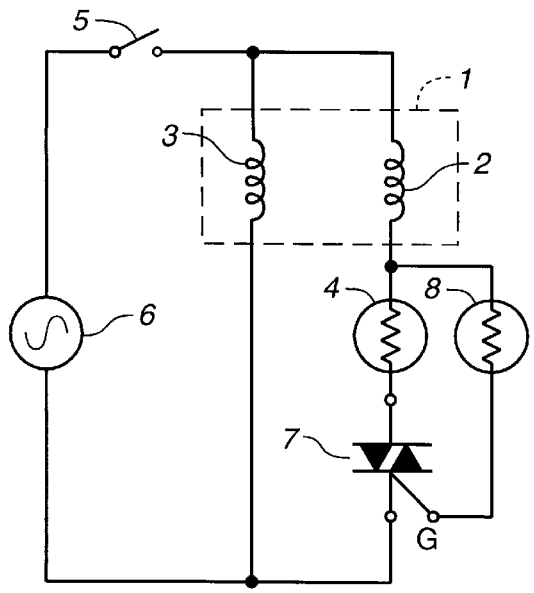
FIG._1
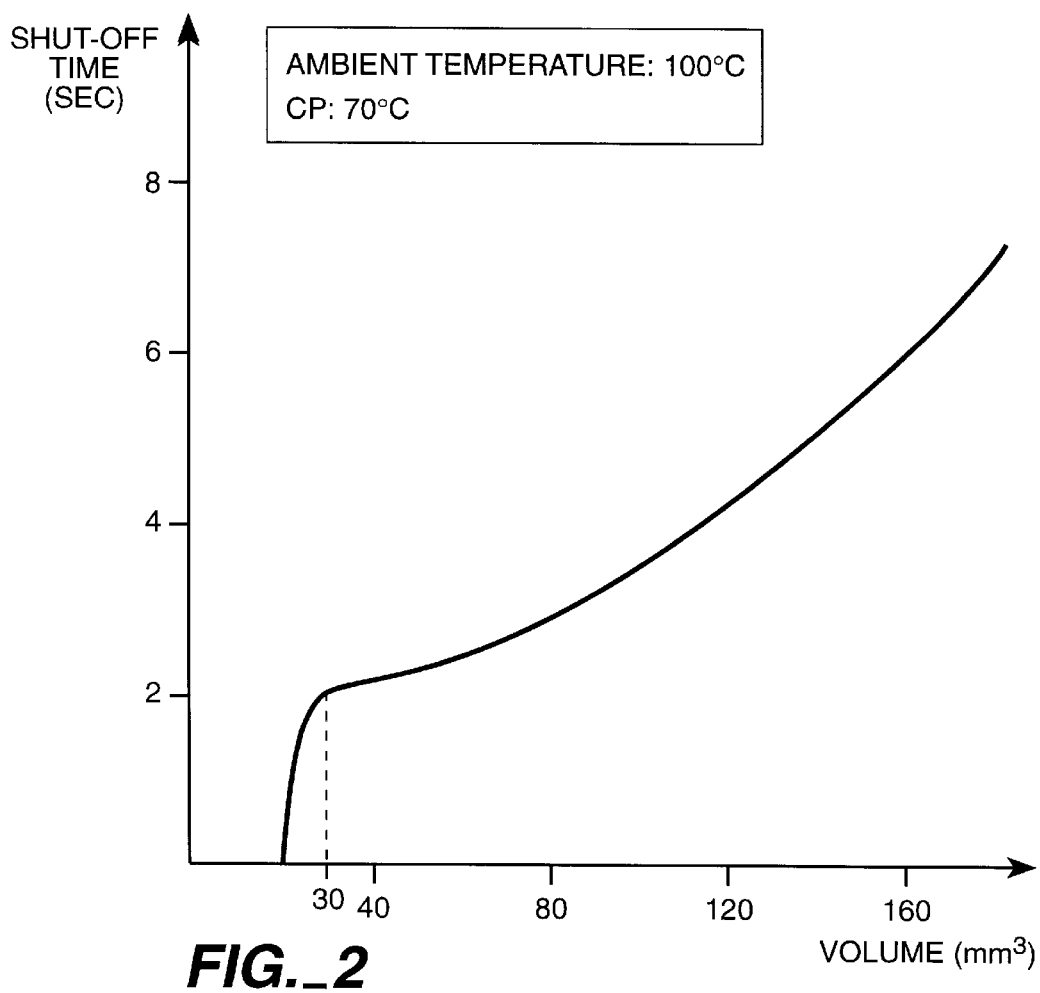
FIG._2

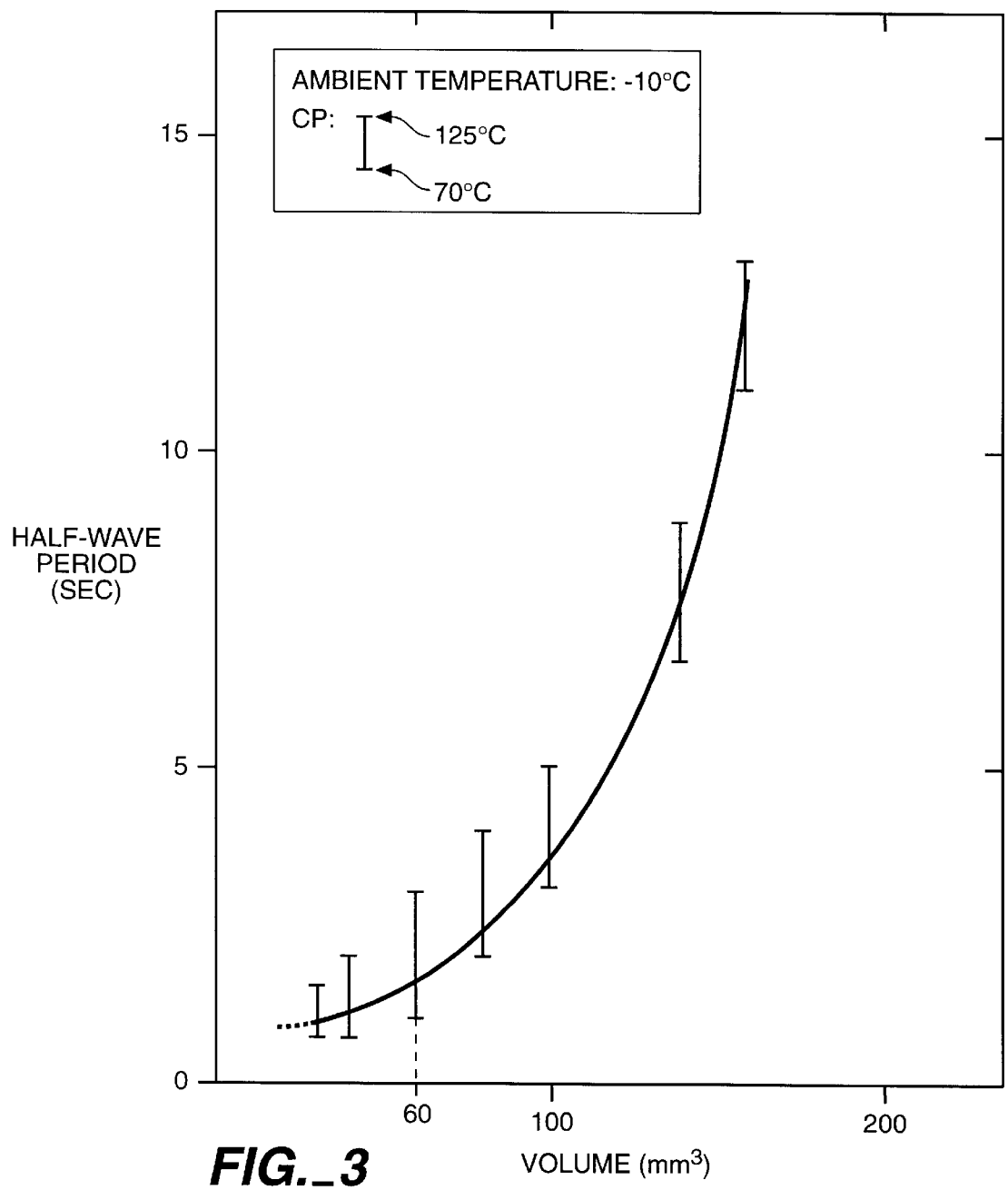
FIG._3

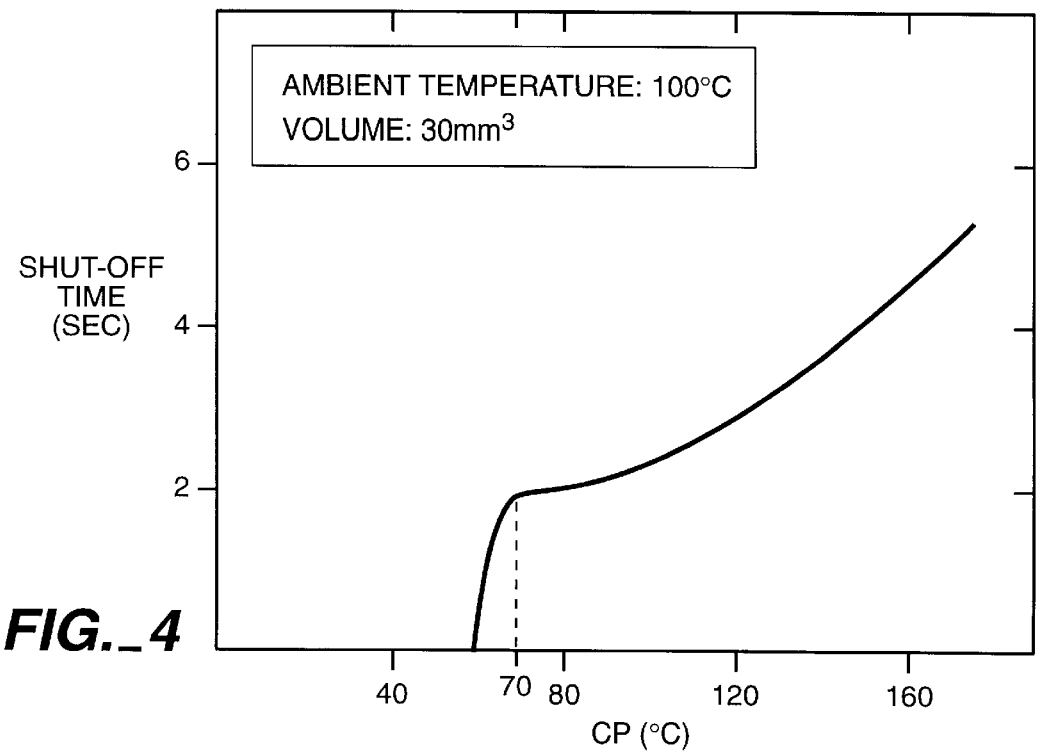
FIG._4
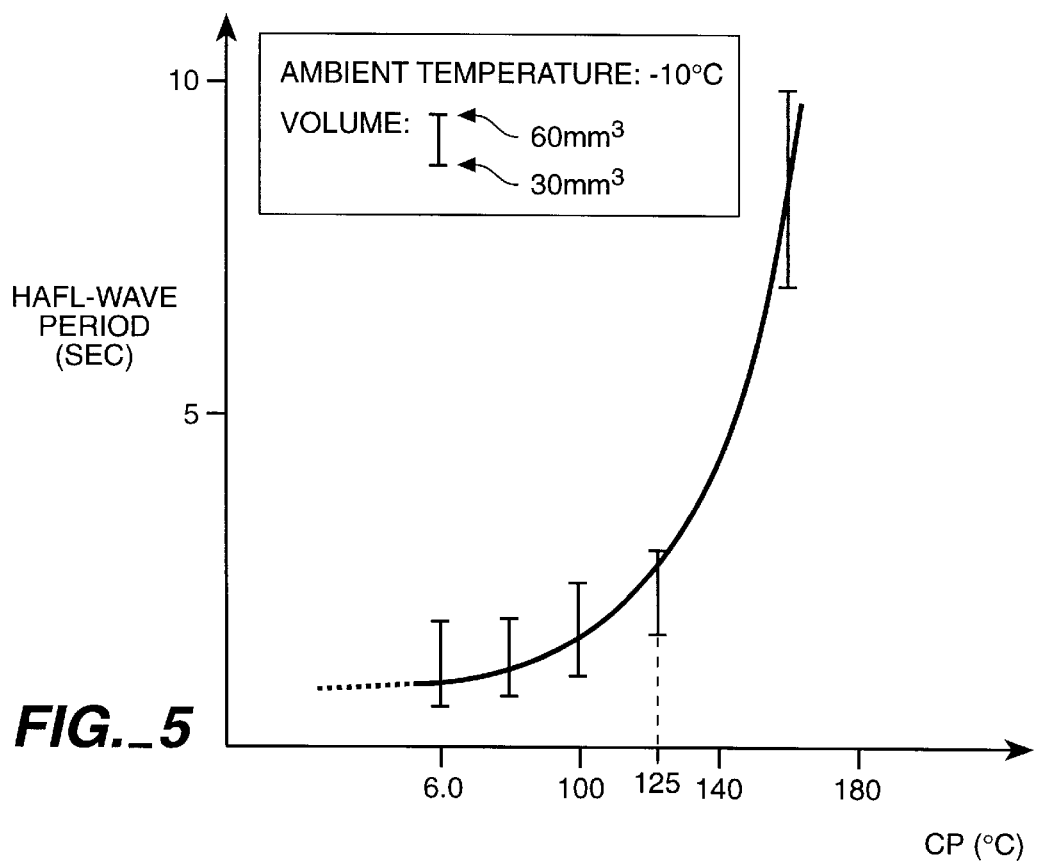
FIG._5

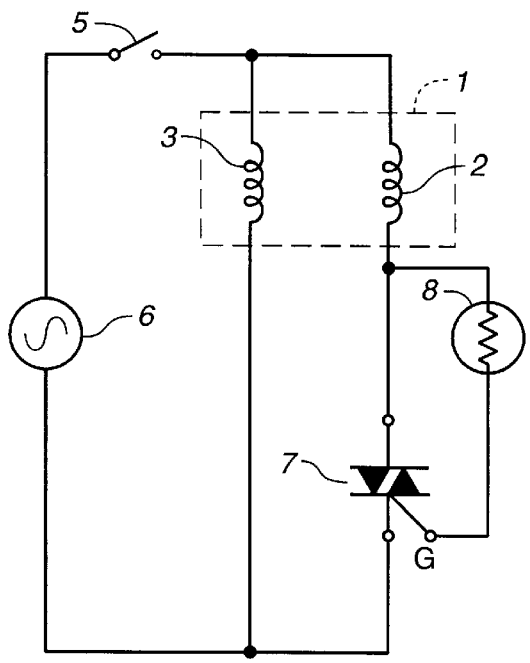
FIG._6
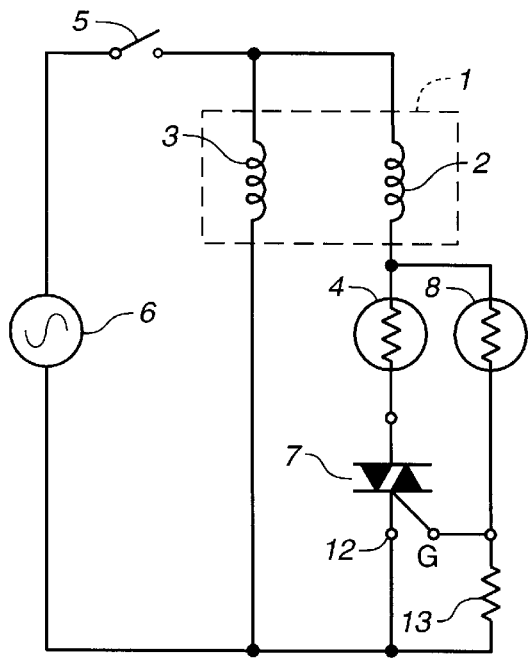
FIG._7
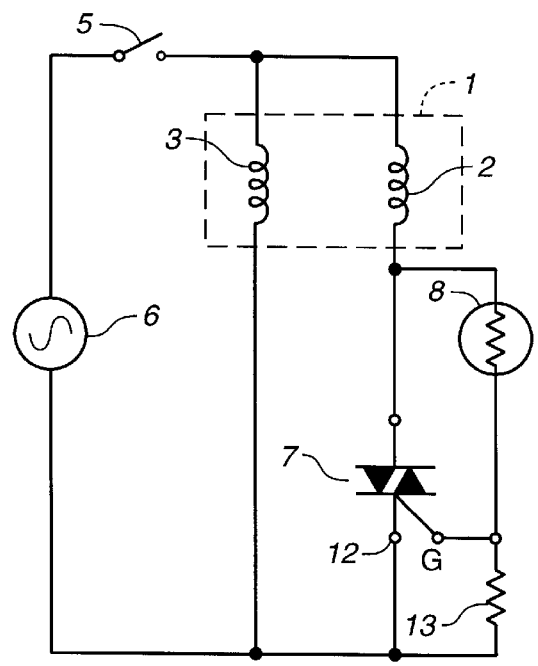
FIG._8

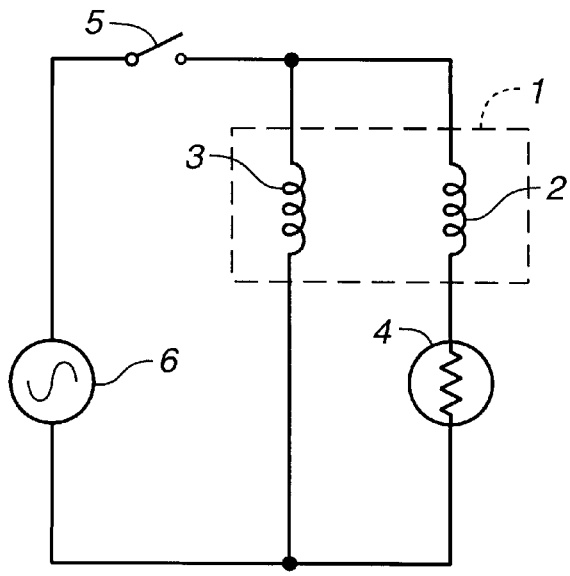
FIG._9
*(PRIOR ART)*
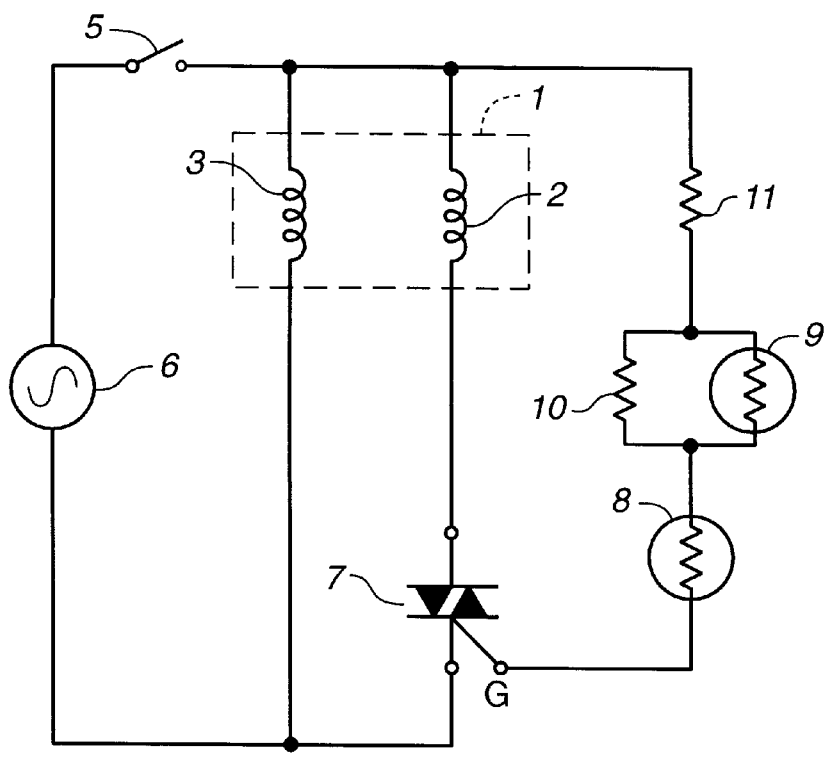
FIG._10
*(PRIOR ART)*

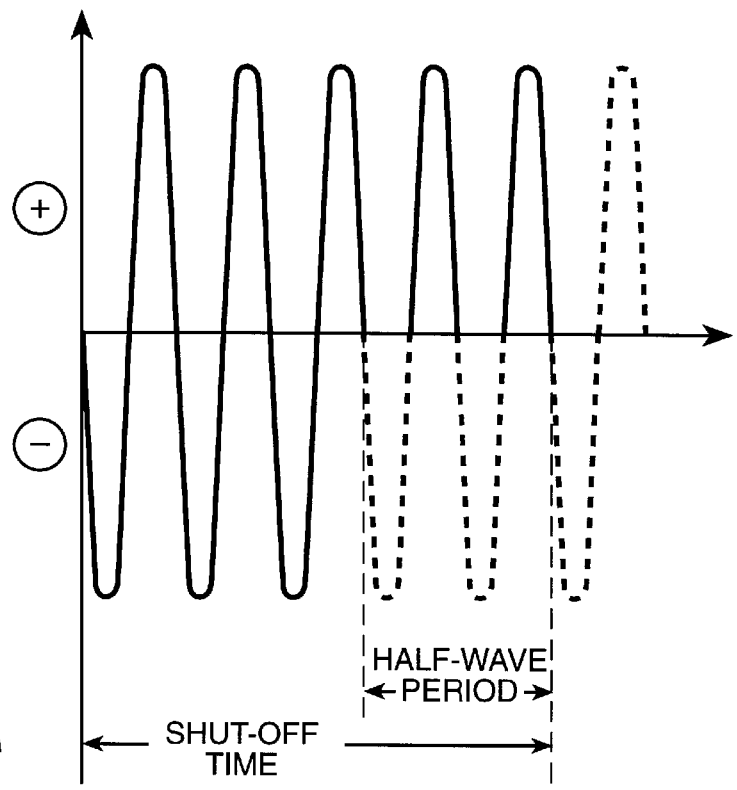
FIG._11A
(PRIOR ART)
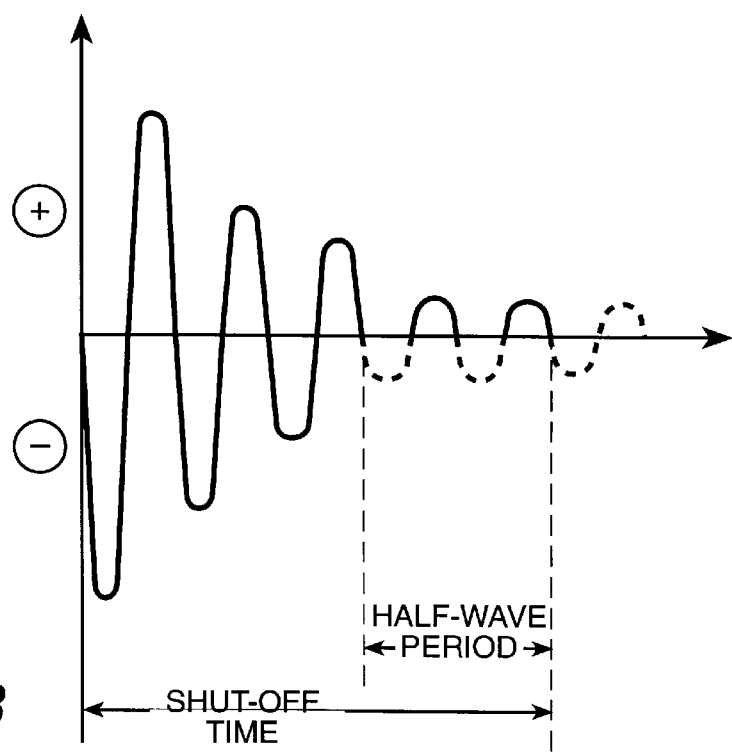
FIG._11B

MOTOR START-UP CIRCUIT WITH A TRIAC AND PTC THERMISTORS

Background of the Invention

This invention relates to a motor start-up circuit and more particularly to the characteristics and specifications of a thermistor with positive temperature characteristic used in such a circuit.

FIG. 9 shows a prior art motor-driving circuit for a motor 1 such as a single-phase induction motor used in the compressor of a refrigerator, comprising an auxiliary coil 2 which functions at the time of the start-up of the motor 1 and a main coil 3 for its steady-state operation. The motor start-up circuit for incorporating into such a motor-driving circuit usually includes a thermistor with a positive temperature characteristic (PTC) 4 connected in series with the auxiliary coil 2 for the motor start-up.

A power source 6 is connected to the motor 1 through a switch 5. During an early stage of the motor start-up after the switch 5 is closed and power from the source 6 begins to be supplied to the motor 1, a relatively large current flows through the PTC thermistor 4 to the auxiliary coil 2 to start up the motor 1. After a certain period of time, the resistance of the PTC thermistor 4 increases due to the heat it produces, and the current flowing through the auxiliary coil 2 is thereby reduced.

The resistance of the thermistor, however, does not become infinitely large. As a result, some unwanted current continues to flow through the PTC thermistor 4 to the auxiliary coil 2 even after the start-up of the motor 1, wasting several watts of electric power.

Japanese Patent Publication Tokkai 6-339291disclosed a method of solving this problem to a certain extent. According to this method, as shown in FIG. 1 which uses the same numerals as in FIG. 9 to indicate the same or equivalent components for convenience, the auxiliary coil 2 is connected in series not only with a PTC thermistor for start-up ("the start-up PTC thermistor") 4 but also with a Triac switch (herein referred to simply as a "triac") 7. Another thermistor with positive temperature characteristic ("triac-controlling PTC thermistor") 8 is connected in parallel with the start-up PTC thermistor 4, one of the terminals of this triac-controlling PTC thermistor 8 being connected to the gate G of the triac 7.

When power from the source 6 is supplied to the motor 1 at the time of its start-up, a trigger signal is applied to the gate G of the triac 7 through the triac-controlling PTC thermistor 8, putting the triac 7 in the current-passing condition and allowing a motor start-up current to flow to the auxiliary coil 2 through the start-up PTC thermistor 4. A certain period of time after the start-up of the motor 1, the resistance of the start-up PTC thermistor 4 increases due to the heat generated by itself and the current through the auxiliary coil 2 is thereby reduced. At the same time, the resistance of the triac-controlling PTC thermistor 8 also increases due to its own heat emission, thereby reducing the current to the gate G of the triac 7 and switching off the triac 7.

A very small current will thereafter continue to flow through the triac-controlling PTC thermistor. Since the thermal capacity of the triac-controlling PTC thermistor 8 can be made much smaller than that of the start-up PTC thermistor 4, however, the power required to keep it at a high-temperature, high-resistance condition is much less than that in the case of the circuit shown in FIG. 9.

If a motor start-up circuit as shown in FIG. 1 is actually used for the start-up of a motor in the compressor of a refrigerator with the ambient temperature allowed to change in the range of −10 to +100° C., however, there are often situations where it fails to dependably shut off the current within a specified short period of time (say, about 1–10 seconds). When it is used outdoors in winter, for example, the heat-up time required for the triac-controlling PTC thermistor 8 to raise its resistance by the heat generated by itself may be considerably long, and the wasted power due to the motor noise and start-up may become quite high. The current may even fail to be shut off.

If it is used under a high-temperature condition such as in summer or if it is attached to the compressor or used near the compressor, on the other hand, the triac-controlling PTC thermistor 8 may be already in a heated-up condition or reach a heated-up condition before the motor is to be started up, failing to properly start up the motor.

Japanese Patent Publication Tokkai 7-123759 disclosed another technology whereby the time required to shut off the current to the auxiliary coil ("the shut-off time") can be kept constant, independent of variations in the ambient temperature. FIG. 10 shows a motor-driving circuit incorporating a motor start-up circuit according to this technology. In FIG. 10, the components which are the same as or equivalent to those shown in FIG. 9 are indicated by the same numerals and are not repetitively explained.

According to this technology, as shown in FIG. 10, a triac 7 is connected in series with the auxiliary coil 2 and a triac-controlling PTC thermistor 8 is connected to the gate G of this triac 7. This triac-controlling PTC thermistor 8 is connected to a parallel connection of a correction thermistor with positive temperature characteristic 9 and a correction-adjusting resistor 10, and this parallel connection is further connected to a current-limiting resistor 11. This series connection consisting of the triac-controlling PTC thermistor 8, the parallel connection and the current-limiting resistor 11 is itself connected in parallel with the auxiliary coil 2 and the triac 7.

With the motor-start circuit thus structured, the parallel connection of the correction thermistor 9 and the correction-adjusting resistor 10 serves to increase or decrease the current flowing through the triac-controlling PTC thermistor 8 according to the changes in the ambient temperature such that its heat emission is controlled and the heat-up time of this triac-controlling PTC thermistor 8 will remain constant. By this method, therefore, the length of time during which the triac remains in the ON condition and hence a current continues to flow through the auxiliary coil can be kept approximately constant, independent of changes in the ambient temperature.

The motor start-up circuit as shown in FIG. 10 is disadvantageous in that it requires a relatively large number of components. Thus, it is costly and difficult to make it compact. It now goes without saying that a large number of components means there are additional problems to be considered regarding the reliability of their operations.

If a triac is used as in the examples shown in FIGS. 1 and 10, furthermore, the difference in the gate sensitivity of the triac depending on the trigger mode gives rise to a so-called half-wave period as illustrated in FIGS. 11A and 11B before the current is completely shut off. If this half-wave period is too long (such as in excess of 3 seconds), the motor may generate a beat noise or begin to pulsate in its rotary motion.

SUMMARY OF THE INVENTION

It is therefore an object of this invention to provide an improved motor start-up circuit with which the problems with prior art technologies can be overcome.

This invention relates to a motor start-up circuit incorporated in a motor-driving circuit comprising an auxiliary coil which operates during a start-up time of the motor and a main coil for its steady-state operation. According to a first embodiment of the invention, the start-up circuit has a start-up thermistor with positive temperature characteristic and a triac connected in series with the auxiliary coil and a triac-controlling thermistor with positive temperature characteristic connected in parallel to the start-up thermistor, and one of the terminals of the triac-controlling thermistor is connected to the gate of the triac. According to a second embodiment of the invention, the start-up circuit has a triac connected in series with the auxiliary coil and a triac-controlling thermistor with positive temperature characteristic connected in parallel to the auxiliary coil and the triac and one of the terminals of the triac-controlling thermistor is connected to the gate of the triac. According to either of these embodiments, the triac-controlling thermistor should have resistance 300–3000 Ω at 25° C. and volume of 30–60 mm$^3$ and its resistance at 25° C. should double at 70–125° C. An additional resistor may be introduced to the circuit of either embodiment, connecting the gate of the triac with another terminal of the triac on the same side of the triac as the gate. More preferably, the triac-controlling thermistor should have resistance 1000–2000 Ω at 25° C. and volume of 30–50 mm$^3$ and its resistance value at 25° C. should double at 85–110° C. Throughout herein the temperature at which the resistance value at 25° C. is doubled will be referred to as "the resistance-doubling temperature" and denoted by symbol CP in the figures.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a diagram of a motor-driving circuit incorporating a motor start-up circuit according to a first embodiment of this invention;

FIG. 2 is a graph showing the relationship between the volume and the shut-off time of the triac-controlling PTC thermistor 8 with the resistance-doubling temperature equal to 70° C., used in the circuit shown in FIG. 1 when the ambient temperature is 100° C.;

FIG. 3 is a graph showing the relationship between the volume and the half-wave period of the triac-controlling PTC thermistor with resistance-doubling temperature between 70° C. and 125° C. used in the circuit of FIG. 1 when the ambient temperature is −10° C.;

FIG. 4 is a graph showing the relationship between the resistance-doubling temperature and shut-off time of the triac-controlling PTC thermistor with volume 30 mm$^3$ used in the circuit shown in FIG. 1 when the ambient temperature is 100° C.;

FIG. 5 is a graph showing the relationship between resistance-doubling temperature and the half-wave period of the triac-controlling PTC thermistor with volume 30–60 mm$^3$ used in the circuit shown in FIG. 1 when the ambient temperature is −10° C.;

FIG. 6 is a diagram of a motor-driving circuit incorporating another motor start-up circuit according to a second embodiment of the invention;

FIG. 7 is a diagram of a motor-driving circuit incorporating still another motor start-up circuit according to a third embodiment of the invention;

FIG. 8 is a diagram of a motor-driving circuit incorporating still another motor start-up circuit according to a fourth embodiment of the invention;

FIG. 9 is a diagram of a motor-driving circuit incorporating a prior art motor start-up circuit;

FIG. 10 is a diagram of a motor-driving circuit incorporating another prior art motor start-up circuit; and FIGS. 11A and 11B show waveforms of the current through the auxiliary coil shown respectively in FIGS. 10 and 1.

Throughout herein, those components which are the same or at least equivalent to each other are indicated by the same numeral and may not necessarily be explained repetitiously.

DETAILED DESCRIPTION OF THE INVENTION

Although FIG. 1 was referenced above as describing the structure of a motor-driving circuit incorporating a motor start-up circuit described in Japanese Patent Publication Tokkai 6-339291, it also represents a motor-driving circuit incorporating a motor start-up circuit according to a first embodiment of this invention. The circuit according to this invention represented by FIG. 1 is characterized, however, not only as including a triac-controlling PTC thermistor 8 connected in parallel with the start-up PTC thermistor 4 and having one of its terminals connected to the gate G of a triac 7, but also wherein its resistance at 25° C. is between 300 and 3000 Ω, its volume is between 30 and 60 mm$^3$ and its resistance-doubling temperature is between 70–125° C.

When the switch 5 of this circuit is closed, a current ("the gate current") will start to flow to the gate G of the triac 7 through the triac-controlling PTC thermistor 8. The triac-controlling PTC thermistor 8 is at normal temperature during the start-up period of the motor 1 and since its resistance is still small, this gate current is sufficiently large to switch on the triac 7. As a result, the triac 7 is triggered every one-half cycle, and a current for starting up the motor 1 flows to the auxiliary coil 2 through the start-up PTC thermistor 4. The motor 1 will be herein assumed to be a single-phase induction motor.

After the motor 1 has been started up, and as the start-up PTC thermistor 4 has been heated up, the current flowing to the auxiliary coil 2 is reduced. The triac-controlling PTC thermistor 8 is also heated up in the meantime, making the gate current very weak, such that the triac 7 is no longer in the ON condition. Since no current is passed to the start-up PTC thermistor 4 in this situation, not only can unwanted waste of power can thus be prevented, but also the start-up PTC thermistor 4 is cooled down and its temperature drops quickly to a normal level.

A very weak current will continue to flow through the triac-controlling PTC thermistor 8 thereafter, but since the volume of the triac-controlling PTC thermistor 8 is only 30–60 mm$^3$, being normally less than one fifth of that of the start-up PTC thermistor 4, the waste in power can also be reduced to less than one fifth. In addition, the return time required until the motor 1 can be restarted can also be reduced significantly. If the resistance at 25° C. of the triac-controlling PTC thermistor 8 is confined within the range of 300 to 3000 Ω, its volume to the range of 30–60 mm$^3$ and its resistance-doubling temperature to the range of 70 –125° C., furthermore, the current to the auxiliary coil 2 can be shut off within a period of 1–10 seconds as long as the ambient temperature remains between −10 and +100° C.

Next, the aforementioned limitations on the characteristics of the triac-controlling PTC thermistor 8 will be explained more in detail.

The volume of the triac-controlling PTC thermistor 8 is between 30 and 60 mm$^3$ according to this invention. The volume of the triac-controlling PTC thermistor 8 and its shut-off time are in positive correlation, that is, the larger the volume, the longer its shut-off time. FIG. 2 shows the relationship between the volume and the shut-off time of a triac-controlling PTC thermistor 8, of which the resistance-doubling temperature is 70° C., when the ambient temperature is 100° C. (the upper limit of the range of temperature under which the use is contemplated). In general, the heat-up process becomes faster and the heat-up time becomes shorter at higher temperatures. FIG. 2 shows that at 100° C. the volume of the triac-controlling PTC thermistor 8 must be greater than 30 mm$^3$ because the shut-off time becomes too short and the motor 1 cannot be started up if the volume is less than 30 mm$^3$.

FIG. 3 shows how the half-wave period changes as the resistance-doubling temperature of the triac-controlling PTC thermistor 8 is changed between 70° C. and 125° C. when the ambient temperature is −10° C. (the lowest limit of the range of temperature under which the use is contemplated). Because the time required to heat up increases with the volume, the half-wave period and the volume are also positively correlated. The half-wave period becomes longer as the ambient temperature drops. At −10° C., if the volume of the triac-controlling PTC thermistor 8 exceeds 60 mm$^3$ the half-wave period becomes excessively long and the motor will develop beat noise and pulsation in its rotary motion.

This is why the volume of the triac-controlling PTC thermistor 8 is selected to be within the range of 30–60 mm$^3$. Since the waste in power increases with the volume of the triac-controlling PTC thermistor 8, however, the preferred range is 30–50 mm$^3$.

The value of the resistance-doubling temperature for the triac-controlling PTC thermistor 8 is within the range of 70–125° C. according to this invention. Since it takes more time to heat up a PTC thermistor 8 with a higher value of the resistance-doubling temperature, the resistance-doubling temperature and the heat-up time of the PTC thermistor are in positive correlation. FIG. 4 shows the relationship between the resistance-doubling temperature and the shut-off time of the triac-controlling PTC thermistor 8 with volume 30 mm$^3$ when the ambient temperature is 100° C. In general, the heat-up time becomes shorter as the ambient temperature increases. When the ambient temperature is 100° C, as shown in FIG. 4, the shut-off time becomes too short and the motor 1 cannot be started up unless the resistance-doubling temperature of the triac-controlling PTC thermistor is greater than 70° C.

FIG. 5 shows the relationship between the resistance-doubling temperature and the half-wave period of PTC thermistors with volume 30 mm$^3$ to 60 mm$^3$ when the ambient temperature is −10° C. The resistance-doubling temperature and the half-wave period are in positive correlation, but the half-wave period becomes too short, as shown in FIG. 5, and the motor develops beat noise and pulsation in its rotary motion if the resistance-doubling temperature of the PTC thermistor exceeds 125° C. when the ambient temperature is −10° C.

In view of all above, the resistance-doubling temperature of the triac-controlling PTC thermistor 8 is selected to be within the range of 70–125° C. Since the waste in power increases as the resistance-doubling temperature becomes higher, it is desirable that the resistance-doubling temperature be lower than 110° C.

As a practical matter, there are fluctuations not only in the resistance-doubling temperature and the volume of the triac-controlling PTC thermistor 8 but also in the ambient temperature and the commercial power source. Thus, if the resistance-doubling temperature of the PTC thermistor is 70° C. and its volume is 30 mm$^3$, FIG. 2 shows that the shut-off time can change quite significantly as a result of even a small fluctuation. This can give rise to a failure of the motor to start up. In view of such possibilities, the resistance-doubling temperature of the triac-controlling PTC thermistor 8 is preferably higher than 85° C.

Next will be discussed the requirement that the resistance at 25° C. of the triac-controlling PTC thermistor 8 be in the range of 300–3000 Ω. After the volume and the resistance-doubling temperature of the triac-controlling PTC thermistor 8 have been selected as above, if the resistance at 25° C. of the PTC thermistor 8 is less than 300 Ω, the gate current becomes too large when the voltage of the commercial power source 6 is high, and this may cause a damage to the triac 7. If it is larger than 3000 Ω, on the other hand, the gate current becomes too weak when the voltage of the source 6 is low and the triac 7 may fail to be switched on especially at a low ambient temperature.

In view of the above, a PTC thermistor with resistance at 25° C. between 300 Ω and 3000 Ω is selected. Since the waste in power tends to become low as the resistance at 25° C. is increased, a triac-controlling PTC thermistor 8 with resistance greater than 1000 Ω at 25° C. is preferred. When a triac-controlling PTC thermistor with volume 30–60 mm$^3$ is produced, it is preferred to make its resistance at 25° C. no greater than 2000 Ω from the point of view of limitations such as its specific resistance and shape.

With the volume, the resistance-doubling temperature and the resistance at 25° C. thus selected, it is possible even with a small number of components to reliably shut off the current to the auxiliary coil 2 within a normal start-up time of a motor (generally 1–10 seconds) and to also reduce the half-wave period under all conditions in the range of ambient temperature between −10 and +100° C.

FIG. 6 shows a motor-driving circuit incorporating another start-up circuit embodying this invention, using the same numerals as used in FIG. 1 to indicate the same or equivalent components. The circuit shown in FIG. 6 is characterized in that a triac 7 is connected in series with the auxiliary coil 2, a triac-controlling PTC thermistor 8 being connected in parallel to this series connection of the auxiliary coil 2 and the triac 7 with one of the terminals of this triac-controlling PTC thermistor 8 being connected to the gate of the triac 7. In this example, too, use is made of a triac-controlling PTC thermistor 8 satisfying the condition that its resistance at 25° C. be 300–3000 Ω, its volume be 30–60 mm$^3$, and its resistance-doubling temperature be 70–125° C. The second embodiment of this invention shown in FIG. 6 is advantageous in that the start-up PTC thermistor 4 shown in FIG. 1 can be dispensed with and hence the circuit can be formed with a smaller number of components.

FIG. 7 shows a motor-driving circuit incorporating still another start-up circuit embodying this invention, using the same numerals as used in FIG. 1 to indicate the same or equivalent components. The circuit shown in FIG. 7 is different from that of FIG. 1 only in that an additional resistor 13 is inserted between the gate of the triac 7 and another of its terminals on the side of the gate.

FIG. 8 shows a motor-driving circuit incorporating still another start-up circuit embodying this invention, using the same numerals as used in FIG. 6 or 7 to indicate the same or equivalent components. The circuit shown in FIG. 8 is different from the one shown in FIG. 6 only in that an additional resistor 13 is inserted between the gate of the triac 7 and another of its terminals on the side of the gate.

The circuits shown in FIGS. 7 and 8 are advantageous in that the current flowing to the gate G is reduced because a portion of the current through the triac-controlling PTC thermistor 8 is directed to the additional resistor 13. This is equivalent to increasing the threshold value (the gate trigger current) at which the triac 7 is sure to be switched on. Thus, the shut-off time becomes somewhat shorter as compared to the corresponding circuit (shown in FIG. 1 or 6) without this additional resistor 13. The half-wave period is also thereby shortened. Since this additional resistor 13 serves to reduce the gate current, as explained above, it also serves to prevent damage to the triac 7 when there is a rise in the voltage of the commercial power source 6.

In these other circuits, too, it is preferred that the resistance at 25° C. of the triac-controlling PTC thermistor 8 be 1000–20000 Ω, its volume be 30–50 mm$^3$, and its resistance-doubling temperature be 85–110° C.

What is claimed is:

1. A motor start-up circuit incorporated in a motor-driving circuit having an auxiliary coil which functions only during a start-up period of time of a motor and a main coil for carrying out a steady state operation of said motor, said motor start-up circuit comprising:

a start-up thermistor with positive temperature characteristic and a Triac switch connected in series with said auxiliary coil; and a triac-controlling thermistor with positive temperature characteristic connected in parallel to said start-up thermistor, one of terminals of said triac-controlling thermistor being connected to a gate terminal of said Triac switch, said triac-controlling thermistor having resistance 300–3000 Ω at 25° C. and volume of 30–60 mm$^3$ which is no smaller than 1% of the volume of said start-up thermistor and doubling said resistance at 25° C. at 70–125° C.

2. The motor start-up circuit of claim 1 further comprising an additional resistor connecting said gate terminal of said Triac switch and another terminal of said Triac switch on the same side of said Triac switch as said gate terminal.

3. The motor start-up circuit of claim 1 wherein said triac-controlling thermistor has resistance 1000–2000 Ω at 25° C. and volume of 30–50 mm$^3$ and doubles said resistance at 25° C. at 85–110° C.

4. The motor start-up circuit of claim 2 wherein said triac-controlling thermistor has resistance 1000–2000 Ω at 25° C. and volume of 30–50 mm$^3$ and doubles said resistance at 25° C. at 85–110° C.

5. A motor start-up circuit incorporated in a motor-driving circuit having an auxiliary coil which functions only during a start-up period of time of a motor and a main coil for carrying out a steady state operation of said motor, said motor start-up circuit comprising:

a Triac switch connected in series with said auxiliary coil; and a triac-controlling thermistor with positive temperature characteristic connected in parallel to said auxiliary coil and said Triac switch, one of terminals of said triac-controlling thermistor being connected to a gate terminal of said Triac switch, said triac-controlling thermistor having resistance 300–3000 Ω at 25° C. and volume of 30–60 mm$^3$ which is no smaller than 1% of the volume of said start-up thermistor and doubling said resistance at 25° C. at 70–125° C.

6. The motor start-up circuit of claim 5 further comprising an additional resistor connecting said gate terminal of said Triac switch and another terminal of said Triac switch on the same side of said Triac switch as said gate terminal.

7. The motor start-up circuit of claim 5 wherein said triac-controlling thermistor has resistance 1000–2000 Ω at 25° C. and volume of 30–50 mm$^3$ and doubles said resistance at 25° C. at 85–110° C.

8. The motor start-up circuit of claim 6 wherein said triac-controlling thermistor has resistance 1000–2000 Ω at 25° C. and volume of 30–50 mm$^3$ and doubles said resistance at 25° C. at 85–110° C.

* * * * *